United States Patent
Bakran

(10) Patent No.: US 9,882,371 B2
(45) Date of Patent: Jan. 30, 2018

(54) DIRECT CURRENT VOLTAGE SWITCH FOR SWITCHING A DIRECT CURRENT IN A BRANCH OF A DIRECT CURRENT VOLTAGE NETWORK NODE

(75) Inventor: Mark-Matthias Bakran, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 526 days.

(21) Appl. No.: 14/408,766

(22) PCT Filed: Jun. 19, 2012

(86) PCT No.: PCT/EP2012/061726
§ 371 (c)(1),
(2), (4) Date: Dec. 17, 2014

(87) PCT Pub. No.: WO2013/189524
PCT Pub. Date: Dec. 27, 2013

(65) Prior Publication Data
US 2015/0207310 A1 Jul. 23, 2015

(51) Int. Cl.
*H02H 3/00* (2006.01)
*H02H 3/087* (2006.01)
*H01H 9/54* (2006.01)
*H01H 33/59* (2006.01)

(52) U.S. Cl.
CPC ............ *H02H 3/087* (2013.01); *H01H 9/542* (2013.01); *H01H 33/596* (2013.01)

(58) Field of Classification Search
CPC ...................................................... H02H 3/087

USPC ......................................................... 361/100
See application file for complete search history.

(56) References Cited

U.S. PATENT DOCUMENTS

| 4,992,904 A * | 2/1991 | Spencer ................. H02H 3/087 361/13 |
| 5,517,378 A | 5/1996 | Asplund et al. |
| 5,999,388 A | 12/1999 | Asplund |
| 8,717,716 B2 | 5/2014 | Haefner et al. |

(Continued)

FOREIGN PATENT DOCUMENTS

| CN | 1518198 A | 8/2004 |
| DE | 69408811 T2 | 10/1998 |

(Continued)

*Primary Examiner* — Stephen W Jackson
(74) *Attorney, Agent, or Firm* — Laurence Greenberg; Werner Stemer; Ralph Locher

(57) ABSTRACT

A device switches a direct current in a branch of a direct current voltage network node. The device contains a constant current path extending between two connection terminals, in which a mechanical switch is disposed. The device further has a switching current path bridging the constant current path and a power switching unit is disposed therein. The power switching unit has power semiconductor switches which can be switched on and off and configured to interrupt a short-circuit current in the event of a fault. The device contains a longitudinal voltage source for generating a counter-voltage in a loop formed by the constant current path and the switching current path. The device can be used economically over long periods of time to control the load flow on a network node. Accordingly, the longitudinal voltage source has a circuit for connecting and disconnecting the electrical power.

5 Claims, 5 Drawing Sheets

(56) References Cited

U.S. PATENT DOCUMENTS

| | | |
|---|---|---|
| 2008/0143462 A1 | 6/2008 | Belisle et al. |
| 2014/0226247 A1* | 8/2014 | Gaxiola ............... H01H 33/596 361/100 |
| 2015/0145330 A1* | 5/2015 | Eckel ........................ H02J 3/36 307/24 |

FOREIGN PATENT DOCUMENTS

| | | |
|---|---|---|
| EP | 0660352 A1 | 6/1995 |
| EP | 0867998 A1 | 9/1998 |
| WO | 2011034140 A1 | 3/2011 |
| WO | 2011057675 A1 | 5/2011 |

* cited by examiner

DIRECT CURRENT VOLTAGE SWITCH FOR SWITCHING A DIRECT CURRENT IN A BRANCH OF A DIRECT CURRENT VOLTAGE NETWORK NODE

BACKGROUND OF THE INVENTION

Field of the Invention

The invention relates to a device for switching a direct current in a branch of a DC voltage network node, having a permanent current path, in which a mechanical switch is arranged, a switched current path which bridges the permanent current path and in which a power switching unit is arranged, which power switching unit has power semiconductor switches which can be switched on and off and is set up to interrupt a short-circuit current in the event of a fault, and a longitudinal voltage source for generating a back-emf in the mesh formed by permanent current path and switched current path.

A device of this type is already known from WO 2011/057675 A1, for example. That document describes a DC voltage switch which has a permanent current path with a mechanical switch and a disconnection branch, which is connected in parallel with the permanent current path. A power switching unit in the form of a series circuit composed of power semiconductor switches is arranged in the disconnection branch, a freewheeling diode being connected in each case so as to be reverse-biased in parallel with said power semiconductor switches. The power semiconductor switches and freewheeling diodes of the power switching units are arranged back-to-back, that is to say the disconnectable power semiconductor switches are arranged in series, wherein, for each power semiconductor switch, a corresponding power semiconductor switch with opposite forward direction is provided. In this way, the current can be interrupted in both directions in the disconnection branch by the power switching unit. In the operating or permanent current path, in addition to the mechanical switch, an electronic auxiliary switch is also arranged in series with the mechanical switch. During normal operation, the current flows via the operating current path and thus via the electronic auxiliary switch and via the closed mechanical switch since the many power semiconductor switches of the disconnection branch represent an increased resistance to the direct current. To interrupt, for example, a short-circuit current, the electronic auxiliary switch, which can also be referred to as longitudinal voltage source, is transferred into its blocking position. As a result of this, the resistance in the operating current path increases, with the result that the direct current in the disconnection branch is commutated. The mechanical disconnection switch can therefore be opened with no current flowing. The short-circuit current conducted via the disconnection branch can be interrupted by the power switching unit. To accommodate the energy which is stored in the DC voltage network and is to be built up during switching, arresters are provided which are in each case connected in parallel with the power semiconductor switches of the disconnection branch.

Further DC voltage switches for switching short-circuit currents at high voltages are disclosed in DE 694 08 811 T2 and in U.S. Pat. No. 5,999,388.

The device mentioned at the outset has the drawback that said device cannot be used for load flow control since the losses occurring at the longitudinal voltage source then occur over long periods of time or even constantly. This is not sustainable from an efficiency or ecological point of view.

BRIEF SUMMARY OF THE INVENTION

The problem addressed by the present invention is therefore that of providing a device of the type mentioned at the outset which can also be used efficiently over long periods of time to control the load flow at a network node.

The invention solves this problem in that the longitudinal voltage source has means for connecting and disconnecting electrical energy.

Owing to the means for connecting and disconnecting electric power, the device according to the invention can also be used over long periods of time for load flow control since the means for connecting and disconnecting electric power make it possible to use in a meaningful manner for any purpose the electric power which is output, for example, by a longitudinal voltage source. On the contrary, if the longitudinal voltage source requires electric power, for example in order to reduce the load current in the branch of the longitudinal voltage source, the latter can be supplied by an independent source with the required power. Disconnected electric power can be used to supply a network situated close to the DC voltage network node, which network is connected, for example, to a further energy source or to additional consumers. Instead of a network, it is also possible to directly connect a consumer to the means for connecting and disconnecting electric power. The consumer is connected, for example, to an alternative energy source. However, at the same time, the consumer may also be an energy store, for example a hydropower store, a mechanical store, an electrical or chemical energy store. If necessary, the consumer then becomes the energy source. As has already been mentioned, the consumer can also be a classical energy consumer, for example an industrial plant, a residential complex, or the like.

However, particular advantages are afforded when the means for connecting and disconnecting electric power are coupled to means for connecting and disconnecting electric power of at least one further device for switching a direct current, which further device for switching a direct current is arranged in another branch of the same DC voltage network node. According to this advantageous configuration of the invention, for example the power drawn in one branch in the longitudinal voltage source can be connected to an identically constructed device which is arranged in another branch. In this connection, it is by no means necessary that all branches of the DC voltage network node are equipped with a device according to the invention; rather, it is sufficient if at least two branches have a DC voltage network node of a device according to the invention and the two devices according to the invention are coupled to one another via the means for connecting and disconnecting electric power. In this case, too, it is again conceivable to provide an independent energy source or an energy store which intermediately stores and, if appropriate, returns to the overall system again the excess energy or power occurring despite the coupling of the two devices. A consumer may also be supplied with the excess power. For complete load flow control, the number of devices according to the invention at one DC voltage network node is one lower than the number of branches of said network node. Therefore, if n is the number of branches of the DC voltage network node, the number m of devices according to the invention necessary for complete load flow control is calculated according to $m=n-1$.

According to the invention, a device is provided which can be coupled, via its means for connecting and disconnecting electrical energy, to other devices which likewise have means for connecting and disconnecting electrical energy. The device according to the invention is provided for use in a high-voltage direct current network, wherein it is possible to couple a plurality of devices via a low-voltage busbar. This significantly reduces the expenditure for power exchange. The longitudinal voltage source of the device according to the invention is used in two cases within the scope of the invention. Thus, said longitudinal voltage source is firstly used as commutation voltage if, for example, short-circuit currents are to be interrupted. First of all, a high current increase and/or a current which is too high over a particular interval is detected. Then, a trigger signal is sent to a trigger unit of the mechanical switch in the permanent current path. At the same time, the power semiconductor switches of the power semiconductor unit in the switched path are switched on. Finally, a back-emf is generated which generates a circulating current in the mesh formed by permanent current path and switched current path, which back-emf is opposed to the short-circuit current to be switched in the permanent circuit path. The longitudinal voltage source generates, for example actively, a back-emf. In a departure therefrom, the longitudinal voltage source is realized as electronic auxiliary switch, as in the document mentioned at the outset. An IGBT or IGCT with freewheeling diode connected so as to be reverse-biased in parallel is suitable as electronic auxiliary switch. Of course, a plurality of series-connected electronic auxiliary switches which are arranged back-to-back can also be used. The disconnection of the auxiliary switch can be compared with applying a back-emf which opposes the flow of current in the permanent current path. By means of the longitudinal voltage source, the current in the disconnection branch is commutated, with the result that the mechanical switch is opened with no current flowing. The actual interruption of the short-circuit current takes place in the power switching unit. However, this is known, for example, from WO 2011/057675 A1, and so a more precise description can be dispensed with at this point.

According to the invention, the longitudinal voltage source is connected to a low-voltage busbar which is configured for alternating current. In this connection, low-voltage means a voltage of a few kilovolts in contrast to the operating voltages of the branch of a few hundred kilovolts.

According to a preferred configuration of the invention, the longitudinal voltage source is arranged in the permanent current path. In this case, the energy required to generate a back-emf, for example to charge capacitors or to operate the power electronics, can be taken directly from the branch in which the device according to the invention is connected in series.

In principle, the longitudinal voltage source can have any design within the scope of the invention. However, particular advantages are seen in that the longitudinal voltage source has at least one submodule which is equipped with an energy store and a power semiconductor circuit, wherein each submodule has means for connecting and disconnecting electric power. If a plurality of submodules of this type is provided, said submodules are connected in series with one another. Submodules such as this are also used in so-called modular multilevel converters for energy transmission and energy distribution.

Advantageously, each submodule has a half-bridge circuit. Half-bridge circuits such as this are equipped with a power semiconductor circuit which consists of a series circuit composed of two power semiconductor switches, wherein the series circuit is connected in parallel with an energy store, for example a unipolar storage capacitor. The potential point between the two power semiconductor switches of the series circuit is connected to a first connection terminal, wherein a pole of the energy store is connected to a second connection terminal of the submodule.

If necessary, a freewheeling diode is connected so as to be reverse-biased in parallel with the power semiconductor switches. By way of example, IGBTs and IGCTs are used as power semiconductor switches. Owing to the half-bridge circuit, either the energy store voltage $U_c$ which drops across the energy store or a zero voltage can be generated across the connection terminals of any submodule. According to this advantageous further development, the longitudinal voltage source can therefore actively generate a back-emf in only one direction. Thus, half-bridge circuits are particularly suitable if the direction of the back-emf to be impressed is known.

However, in order to be able to build up a voltage in both directions, submodules which have a full-bridge circuit are advantageous. These submodules are also connected in series, with the result that the longitudinal voltage source consists of a series circuit composed of submodules. The submodules having a full-bridge circuit are in each case equipped with two series circuits composed of two power semiconductor switches, wherein the potential point between the two series-connected power semiconductor switches of the first series circuit is connected to the first connection terminal and the potential point between the two power semiconductor switches of the second series circuit is connected to the second connection terminal. Both series circuits are connected in parallel with an energy store. In total, the full-bridge circuit therefore has four power semiconductor switches. If necessary, a freewheeling diode is connected so as to be reverse-biased in parallel with each of these power semiconductor switches. Owing to this circuit arrangement, either the energy store voltage $U_c$ which drops across the energy store, a zero voltage or the inverse energy store voltage $-U_c$ can be generated across the connection terminals of any submodule. Thus, back-emfs can be built up in both directions using a series circuit composed of such full-bridge submodules, wherein the maximum back-emf depends on the number of submodules. By using pulse-width modulation in the case of controlling the power semiconductor switches, the back-emf can be practically continuously varied between the maximum positive and the maximum inverse energy store voltage.

Expediently, an AC voltage in the low-voltage range can be generated using the means for connecting and disconnecting electric power. The AC voltage has the advantage that it can be simply, for example inductively, and inexpensively coupled to the other AC voltage-generating means for connecting and disconnecting electric power.

According to another related expedient further development, the means for connecting and disconnecting electric power have at least one series circuit composed of two power semiconductor switches which can be switched on and off and a coil, which series circuit is connected in parallel with the energy store. One of the terminals of the coil is connected to the potential point between the power semiconductor switches of said series circuit. According to a related further development, in addition to a coil, at least one capacitor is also used. In addition, two series circuits in the form of a hard-switched full-bridge can be used, wherein the potential points between the two power semiconductor switches of the two series circuits are connected to different terminals of the coil.

Expediently, the coil is inductively coupled to a coil of a longitudinal voltage source of a further device according to the invention, which is arranged in another branch of the DC voltage network node. Said inductive coupling is done via single transformers, for example. The single transformers have secondary windings which are connected to the low-voltage busbar. It is also possible to arrange all coils on a common transformer.

The invention likewise relates to a network voltage node with branches, wherein a device according to the present invention is arranged in at least two branches. Expediently, the means for connecting and disconnecting electric power of the at least two devices according to the invention are coupled together via a low-voltage busbar. The low-voltage busbar is set up for AC voltages, for example.

BRIEF DESCRIPTION OF THE SEVERAL VIEWS OF THE DRAWING

Further expedient configurations and advantages of the invention are the subject of the following description of exemplary embodiments of the invention with reference to the figures of the drawing, wherein identical reference signs denote identically acting components, and wherein.

DESCRIPTION OF THE INVENTION

Figure 1:
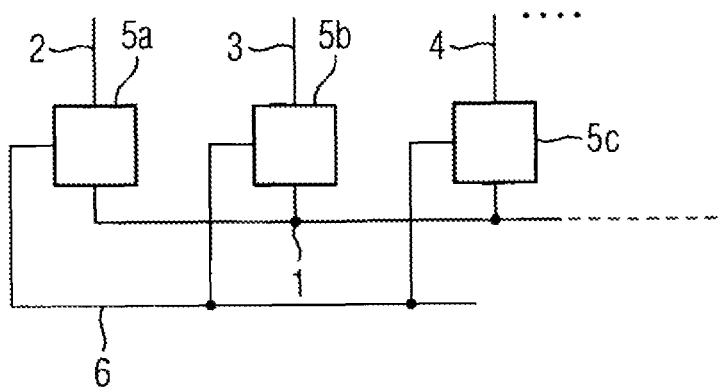
FIG. 1 shows a DC voltage network node with a series of branches, in which in each case an exemplary embodiment of the device according to the invention is schematically illustrated, FIG. 2 schematically illustrates an exemplary embodiment of the device according to the invention.

FIG. 1 shows an exemplary embodiment of a DC voltage network node 1 according to the invention which has a series of branches 2, 3, 4, in which in each case an exemplary embodiment of the device 5 according to the invention is arranged. Each device 5 has means—not shown in the figure—for connecting and disconnecting electric power, wherein the means for connecting and disconnecting electric power are connected to one another via a low-voltage busbar 6. In this way, a power exchange between the devices 5a, 5b and 5c is made possible.

Figure 2:
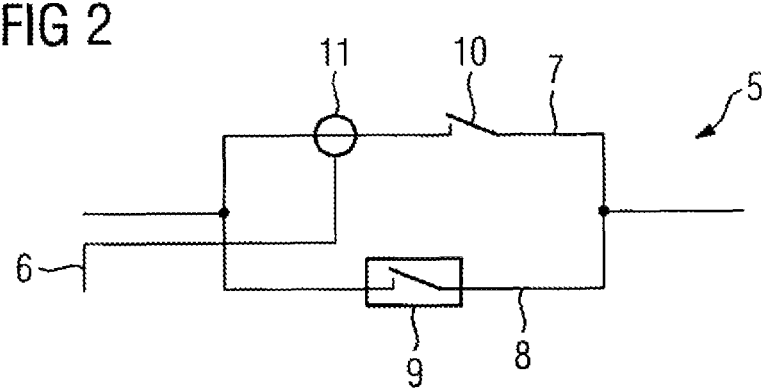

FIG. 2 shows an exemplary embodiment of the device 5 according to the invention in more detail. The device 5 has a permanent current path 7 and a disconnection current path 8, in which a power switching unit 9 is arranged. The power switching unit 9 is set up to interrupt high short-circuit currents which are driven by high voltages of up to 500 kV. Power switching units such as this are known to the person skilled in the art, and therefore the configuration thereof need not be described in detail at this point. By way of example, they have a series circuit composed of power semiconductor switches, IGBTs, IGCTs, GTOs, or the like, a freewheeling diode being in each case connected so as to be reverse-biased in parallel therewith. In this case, the power semiconductor switches and thus also the freewheeling diodes associated therewith are not all oriented in the same current direction; rather, a back-to-back arrangement of the power semiconductor switches enables currents to be switched in both directions. To build up the energy which is released during switching, arresters connected in parallel with respect to the power semiconductor switches are used.

In the permanent current path 7, a rapid mechanical switch 10 is arranged, which switch is closed during normal operation. Furthermore, a longitudinal voltage source 11 is schematically illustrated and the low-voltage busbar 6 for coupling the devices 5a, 5b, 5c. As has already been explained, the longitudinal voltage source actively generates a back-emf in the mesh consisting of permanent current path 7 and disconnection path 8. The back-emf ensures a circulating current in the mesh, which circulating current is opposed to the operating direct current in the permanent current path. The resultant current in the permanent current path can thus be limited or completely suppressed.

Figure 3:
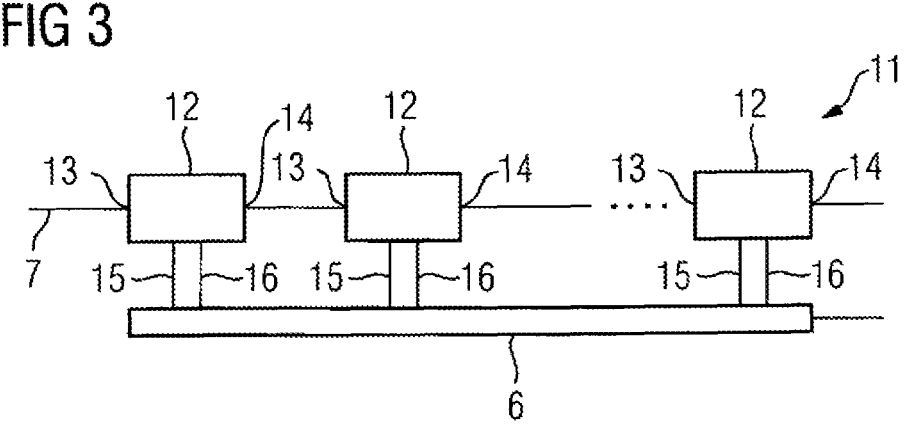
FIG. 3 illustrates an exemplary embodiment of a longitudinal voltage source of the device according to FIG. 2.

FIG. 3 shows an exemplary embodiment of the longitudinal voltage source 11 which consists here of a series circuit composed of submodules 12. The submodules 12 each have a first connection terminal 13 and a second connection terminal 14. In this case, the connection terminals 13 and 14 are arranged in the permanent current path 7, where they cause a direct current during normal operation. Each submodule also has a first AC voltage connection terminal 15 and a second AC voltage connection terminal 16. The two AC voltage connection terminals 15 and 16 are each connected to the low-voltage busbar 6. By way of example, inductances, transformers or the like can be used here; this will be discussed in more detail below.

Figure 4:
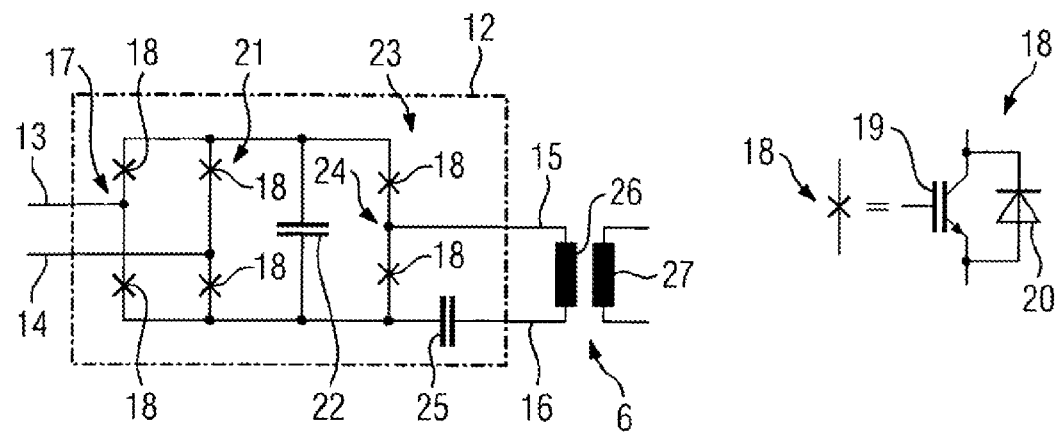
FIG. 4 illustrates a submodule of a longitudinal voltage source including the means for connecting and disconnecting electric power.

FIG. 4 shows an exemplary embodiment of a submodule 12 in more detail, wherein the submodule illustrated in FIG. 4 has a full-bridge circuit. In other words, the submodule 12 has a first series circuit composed of two power semiconductor switch units 18. Each power semiconductor switch unit 18 consists of an IGBT 19 as power semiconductor switch and a freewheeling diode 20 connected so as to be reverse-biased in parallel therewith. Furthermore, a second series circuit 19 can be identified, which is likewise formed by two power semiconductor switch units 18. The first series circuit 17 and the second series circuit 21 are each connected in parallel with an energy store 22, which is designed as storage capacitor. The potential point between the power semiconductor switch units 18 of the first series circuit 17 is connected to the first connection terminal 13 and the potential point between the power semiconductor switch units 18 of the second series circuit 21 is connected to the second connection terminal 14 of the submodule 12. Furthermore, means for connecting and disconnecting electric power 23 are provided, which have a series circuit 24 composed of two power semiconductor switch units 18, wherein the potential point between the power semiconductor switch units 18 of the series circuit 24 is connected to the first AC voltage connection terminal 15. The second AC voltage connection terminal 16 is connected via a capacitor 25 to the pole of the energy store 22. Furthermore, the means for connecting and disconnecting electric power 23 have an inductance 26, which is coupled to an inductance 27 of the low-voltage busbar 6. Owing to a lack of grounding, the inductance or coil 26 must not be designed for high voltages in the region of 500 kV.

Owing to its connection to one of the poles of the energy store, that is to say to the intermediate circuit, by interconnection of a capacitor, the AC voltages which can be generated using said inductance fall in the low-voltage range.

Figure 5:
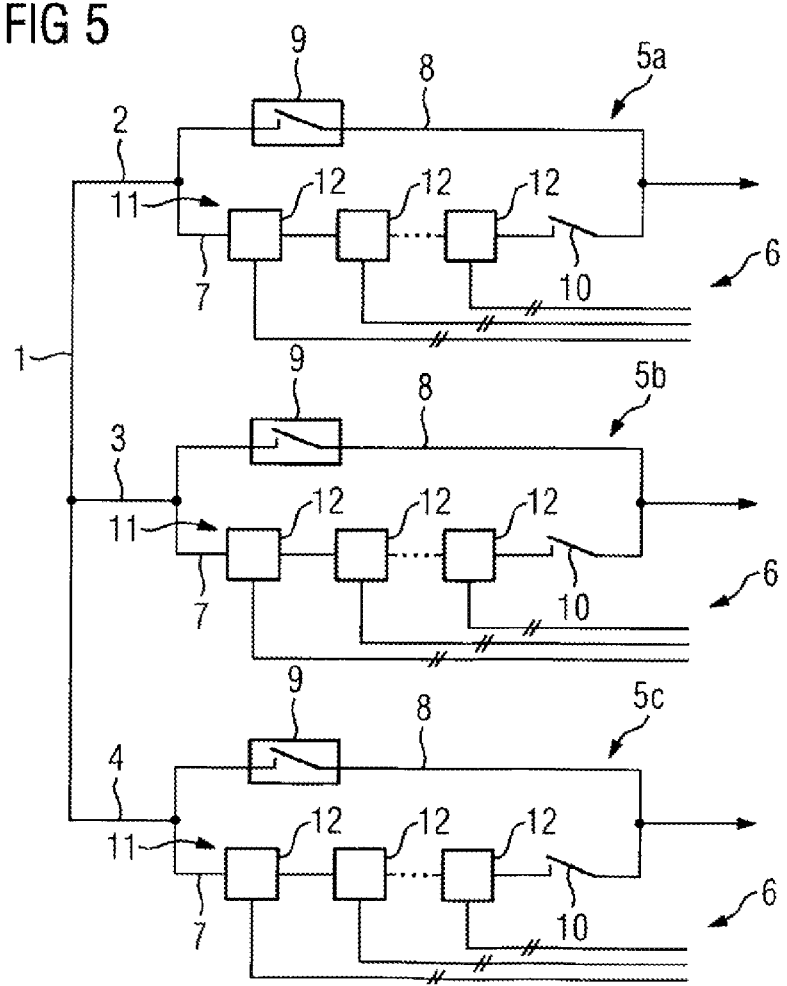
FIG. 5 shows another exemplary embodiment of a DC voltage network node according to the invention with three branches, in which in each case an exemplary embodiment of the device according to the invention is arranged, FIGS. 6-11 schematically illustrate in each case an exemplary embodiment of the means for connecting and disconnecting electric power.

FIG. 5 shows a further exemplary embodiment of the DC voltage network node 1 according to the invention with three branches 2, 3, 4, in which in each case an exemplary embodiment of the device 5a, 5b or 5c according to the invention is arranged. As has already been mentioned in connection with the description of FIGS. 1 to 4, each device 5a, 5b or 5c has in each case a power switching unit 9, which is arranged in the switched current path 8. In the permanent current path 7, a mechanical isolator 10 and a longitudinal voltage source 11, which consists of a series circuit composed of submodules 12, are again arranged, wherein each submodule is equipped with means for connecting and disconnecting electric power. Said means for connecting and disconnecting electric power are coupled to one another via a low-voltage busbar.

Figure 6:
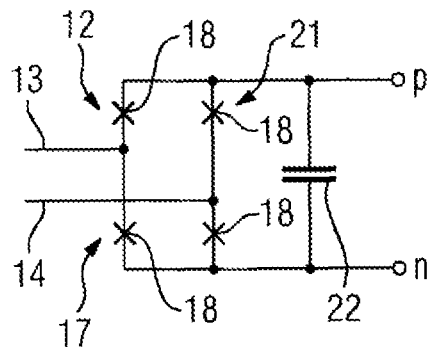

FIG. 6 shows once again a submodule 12 with full-bridge, which has already been mentioned in connection with FIG. 4. In FIG. 6, however, the submodule 12 is shown without means for connecting and disconnecting electric power. Instead, DC voltage-side connection points P and N for connecting the means 23 for connecting and disconnecting electric power are illustrated.

Figure 7:
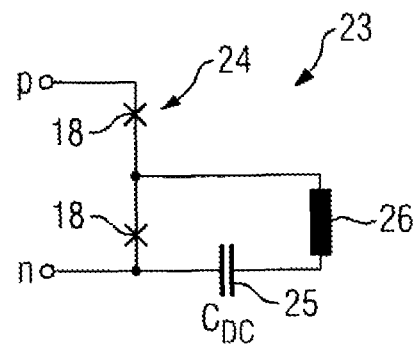
Figure 8:
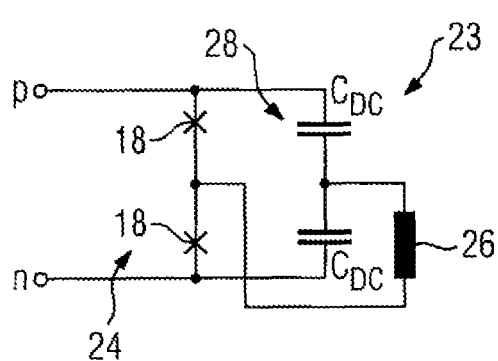

In FIGS. 7, 8, 9, 10 and 11, different configurations of the means 23 for connecting and disconnecting electric power are shown. FIG. 7 shows a first exemplary embodiment of the means 23 for connecting and disconnecting electric power, which has already been mentioned in connection with FIG. 4. FIG. 8 shows a further exemplary embodiment of the means 23 for connecting and disconnecting electric power, which is configured as a half-bridge according to the example according to FIG. 7 and has a series circuit 24 composed of two power semiconductor switch units 18, wherein the series circuit 24 is connected in parallel with a series circuit composed of two capacitors $C_{DC}$. The potential point between the two capacitors is connected to the first terminal of the coil 26, wherein the other terminal of the coil 26 is connected to the potential point between the power semiconductor switch units 18 of the series circuit 24. Like the configuration of the means for connecting and disconnecting electric power illustrated in FIG. 7, the exemplary embodiment according to FIG. 8 is a hard switching half-bridge. In comparison to FIG. 7, however, the intermediate circuit is realized by the capacitors $C_{DC}$ as voltage divider.

Figure 9:
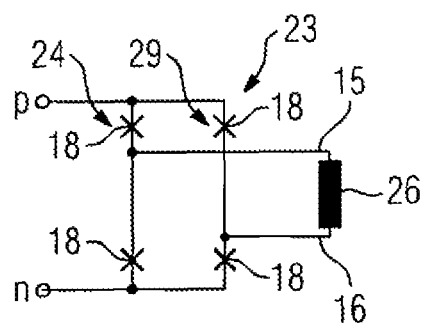

FIG. 9 shows another exemplary embodiment of the means 23 for connecting and disconnecting electric power, which, in addition to a first series circuit composed of two power semiconductor switch units, has a second series circuit 29 composed of two power semiconductor switch units 18. The potential point between the power semiconductor switch units 18 of the first series circuit 24 is connected via the first AC voltage connection terminal 15 to a first terminal of the coil 26, while the potential point between the power semiconductor switch units 18 of the second series circuit 29 is connected via the second AC voltage connection terminal 16 to the other terminal of the coil 26. The circuit according to FIG. 9 can also be referred to as hard switched full-bridge.

Figure 10:
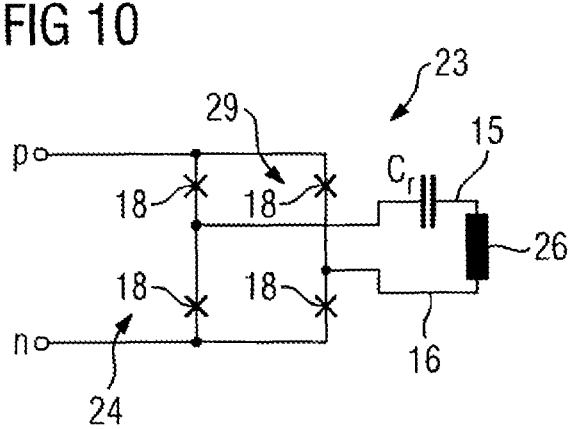

The exemplary embodiment according to FIG. 10 corresponds to the greatest extent to the exemplary embodiment according to FIG. 9, wherein a capacitor $C_r$ is arranged in the first AC voltage connection terminal 15, that is to say on the AC voltage-side, however. Accordingly, this is a resonant switched full-bridge.

Figure 11:
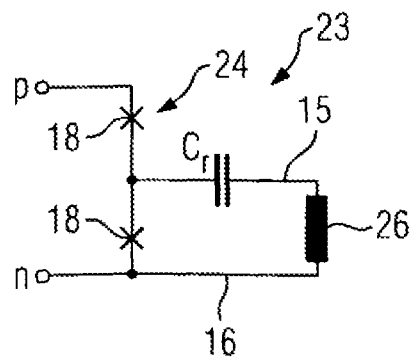

FIG. 11 corresponds to the greatest extent to the exemplary embodiment according to FIG. 7, wherein the capacitor is arranged on the AC voltage-side of the coil 26 as resonant capacitor, however. The means 23 for connecting and disconnecting electric power according to FIG. 11 can thus be referred to as resonant switched half-bridge.

With respect to the exemplary embodiments 7 to 11, it can be summarized that the means for connecting and disconnecting electric power as half-bridge or full-bridge can be embodied both as hard switching and as resonant switching. The resonant circuit has the advantage of higher clocking frequencies being achievable and thus a smaller size of the transformer or transformers for coupling the inductances of different devices according to the invention.

Figure 12:
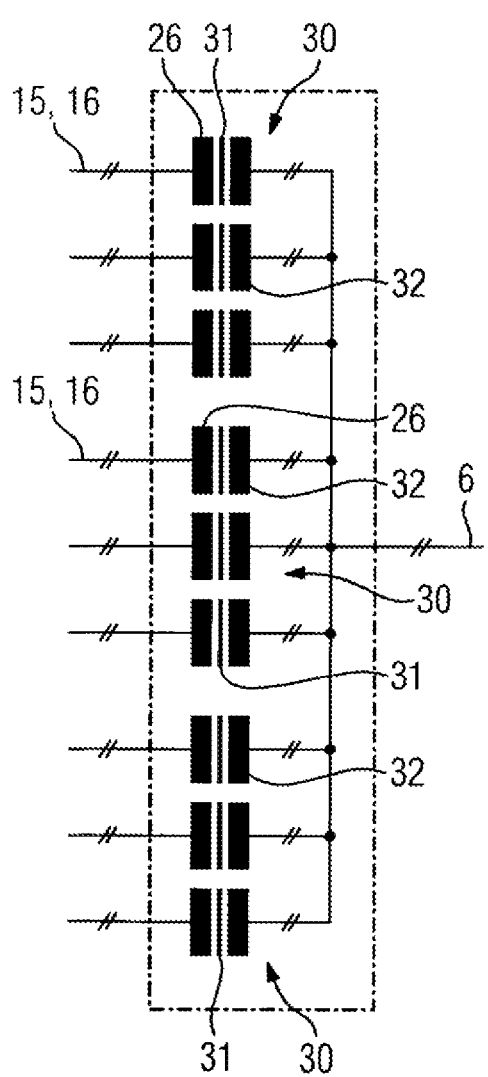
FIGS. 12-14 illustrate exemplary embodiments of transformers for coupling the AC voltages which are generated by the means for connecting and disconnecting electric power.
Figure 13:
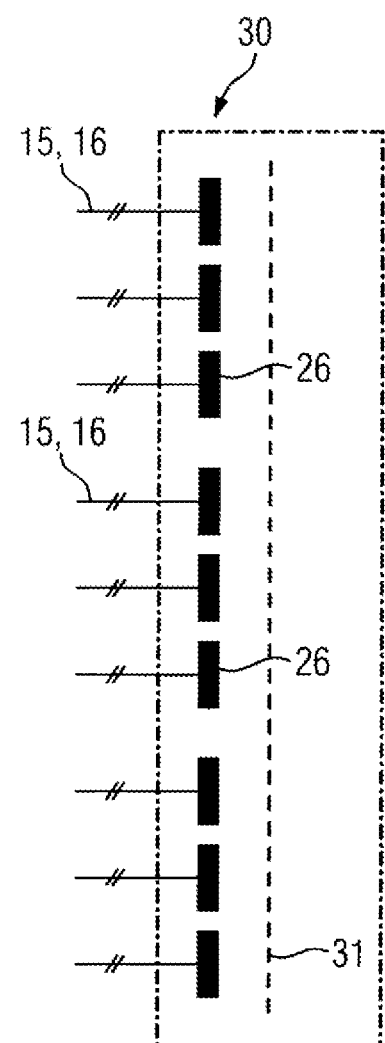
Figure 14:
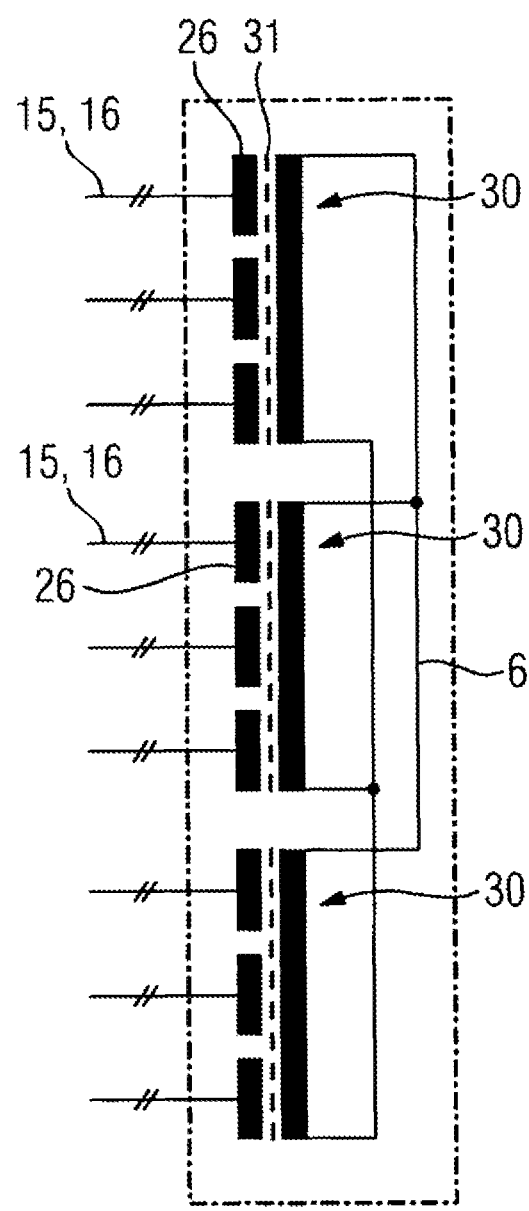

Possible realizations of such transformers 30 are shown in FIGS. 12, 13 and 14. In the case of the exemplary embodiment according to FIG. 12, a multiplicity of single transformers 30 are provided. The primary winding of each single transformer 30 is formed by a coil 26 of the means 23 for connecting and disconnecting electric power. It is coupled to a secondary winding 32 via a core 31 at the transformer 30. All secondary windings are connected to one another via the busbar 6.

FIG. 14 shows an exemplary embodiment with three transformers 30. The secondary windings of the transformers 30 are again connected to one another via a busbar 6. However, the secondary windings are in each case coupled to a plurality of inductances or coils 26 of the means 23 for connecting and disconnecting electric power. In contrast to the exemplary embodiments 12 and 14, the transformer 30 according to FIG. 13 does not have any secondary windings or a busbar 6; rather, the inductances of the means for connecting and disconnecting electric power are coupled to one another solely via the core 31 of the transformer. In this case, the exchanged powers add up to zero.

The invention claimed is:

1. A device for switching a direct current in a branch of a DC voltage network node, the device comprising:
a permanent current path;
a mechanical switch disposed in said permanent current path;
a switched current path bridging said permanent current path;
a power switching unit disposed in said switched current path, said power switching unit having power semiconductor switches being switched on and off and set up to interrupt a short-circuit current in an event of a fault; and
a longitudinal voltage source for generating a back-emf in a circuit formed by said permanent current path and said switched current path, said longitudinal voltage source having means for connecting and disconnecting electric power, said longitudinal voltage source having at least one submodule with an energy store, a power semiconductor circuit, and said means for connecting and disconnecting the electric power, an AC voltage in a low-voltage range being generated using said means for connecting and disconnecting the electric power;
said means for connecting and disconnecting the electric power having at least one series circuit composed of two power semiconductor switches being switchable on and off and a coil connected in parallel with said energy store;

said coil being inductively coupled to a further coil of a further longitudinal voltage source of a further device, the further device being disposed in another branch of the DC voltage network node, the further device including:
a further permanent current path;
a further mechanical switch disposed in the further permanent current path;
a further switched current path bridging the further permanent current path;
a further power switching unit disposed in the further switched current path, the further power switching unit having further power semiconductor switches being switched on and off and set up for interrupting a short-circuit current in an event of a fault; and
said further longitudinal voltage source for generating a back-emf in a further circuit formed by the further permanent current path and the further switched current path, the further longitudinal voltage source having further means for connecting and disconnecting the electric power.

2. The device according to claim 1, wherein said means for connecting and disconnecting the electric power is coupled to a further means for connecting and disconnecting the electric power of a further device for switching a direct current, the further device for switching the direct current is disposed in another branch of the DC voltage network node.

3. The device according to claim 1, wherein said longitudinal voltage source is disposed in said permanent current path.

4. The device according to claim 1, wherein said sub-module has a half-bridge circuit.

5. The device according to claim 1, wherein said sub-module has a full-bridge circuit.

* * * * *